United States Patent
Qin et al.

(10) Patent No.: US 10,944,343 B2
(45) Date of Patent: Mar. 9, 2021

(54) ACTUATOR HAVING TWO MOTORS AND COOLING FAN MODULE USING THE SAME

(71) Applicant: Johnson Electric International AG, Murten (CH)

(72) Inventors: Ruifeng Qin, Hong Kong (CN); Kwokkuen Tse, Hong Kong (CN); Tao Qu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 16/508,502

(22) Filed: Jul. 11, 2019

(65) Prior Publication Data
US 2020/0021211 A1 Jan. 16, 2020

(30) Foreign Application Priority Data
Jul. 11, 2018 (CN) .......................... 201810748380.5

(51) Int. Cl.
| | |
|---|---|
| H02P 5/68 | (2006.01) |
| F04D 15/00 | (2006.01) |
| H02P 7/29 | (2016.01) |
| H02P 7/292 | (2016.01) |

(52) U.S. Cl.
CPC ............ H02P 5/68 (2013.01); F04D 15/0066 (2013.01); F04D 15/0088 (2013.01); H02P 7/29 (2013.01); H02P 7/292 (2013.01)

(58) Field of Classification Search
CPC .... H02P 5/68; H02P 27/08; H02P 1/56; H02P 29/024; H02P 7/05; H02P 7/29; H02P 7/292; F04D 25/166; F04D 15/0066; F04D 15/0088; F04D 27/008
See application file for complete search history.

(56) References Cited

U.S. PATENT DOCUMENTS

| | | | | |
|---|---|---|---|---|
| 6,199,398 B1 * | 3/2001 | Takeuchi | ................ | F01P 7/048 62/133 |
| 7,271,561 B2 * | 9/2007 | Chen | ...................... | G06F 1/206 318/473 |
| 8,011,896 B2 * | 9/2011 | Wu | .................... | H05K 7/20209 417/237 |
| 8,400,083 B2 * | 3/2013 | Ikeda | ...................... | H02P 27/06 318/268 |
| 10,006,334 B2 * | 6/2018 | Johnson | .................. | F01P 7/044 |
| 10,450,055 B2 * | 10/2019 | Huynh | .................... | B64C 13/50 |
| 10,690,370 B2 * | 6/2020 | Uemura | .................. | F24F 11/76 |

(Continued)

FOREIGN PATENT DOCUMENTS

JP    2003116293 A    *  4/2003

OTHER PUBLICATIONS

Extended European Search Report dated Dec. 19, 2019 in connection with European application No. 190185568.3.

Primary Examiner — Thai T Dinh
(74) Attorney, Agent, or Firm — Millman IP Inc.

(57) ABSTRACT

An actuator for a cooling fan module includes a controller, a first motor and a second motor. The controller includes a controlling unit configured to receive control commands, and a motor driving unit electrically connected to the controlling unit and powered by a DC power supply. The first motor is electrically connected to the motor driving unit. The second motor is connected in parallel to the first motor. The first motor and the second motor are synchronously driven and controlled by the controller.

7 Claims, 7 Drawing Sheets

(56) References Cited

U.S. PATENT DOCUMENTS

2009/0155103 A1\* 6/2009 De Filippis ........... F04D 25/166
                                                                                417/423.5
2012/0229067 A1\* 9/2012 Barbero ............... H02H 1/0038
                                                                                 318/490
2019/0293077 A1\* 9/2019 Brendel ................ F04D 25/166

\* cited by examiner

ACTUATOR HAVING TWO MOTORS AND COOLING FAN MODULE USING THE SAME

CROSS REFERENCE TO RELATED APPLICATIONS

This non-provisional patent application claims priority under 35 U.S.C. § 119(a) from Patent Application No. 201810748380.5 filed in The People's Republic of China on Jul. 11, 2018.

FIELD OF THE DISCLOSURE

This present disclosure relates to a cooling fan module for a motor vehicle. In particular, the present disclosure relates to a cooling fan module with two motors.

BACKGROUND OF THE DISCLOSURE

In recent years, demands for an actuator having two or more motors to drive two or more devices is increasing rapidly. For example, to provide broader cooling area, a cool fan module for a vehicle should be equipped with two or more motors. When multiple motors are used in an actuator, coordinated control of multiple motors is required to achieve coordinated operation. Traditionally, this kind of actuator is expensive since it includes two or more relays or PWM units to respectively control the two or more motors to enable each of the motor can to be controlled independently. Therefore, a low cost actuator including two or more motors is desired.

SUMMARY

Thus, there is a desire for an actuator and a corresponding cooling fan module to address the aforementioned problems.

According to one aspect, an actuator for a cooling fan module is provided. The actuator includes a controller, a first motor and a second motor. The controller includes a controlling unit configured to receive control commands, and a motor driving unit electrically connected to the controlling unit and powered by a DC power supply. The first motor is electrically connected to the motor driving unit. The second motor is connected in parallel to the first motor. The first motor and the second motor are synchronously driven and controlled by the controller.

According to another aspect, a cooling fan module is provided. The cooling fan module includes the actuator as above and two fans respectively driven by the first and the second motors.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
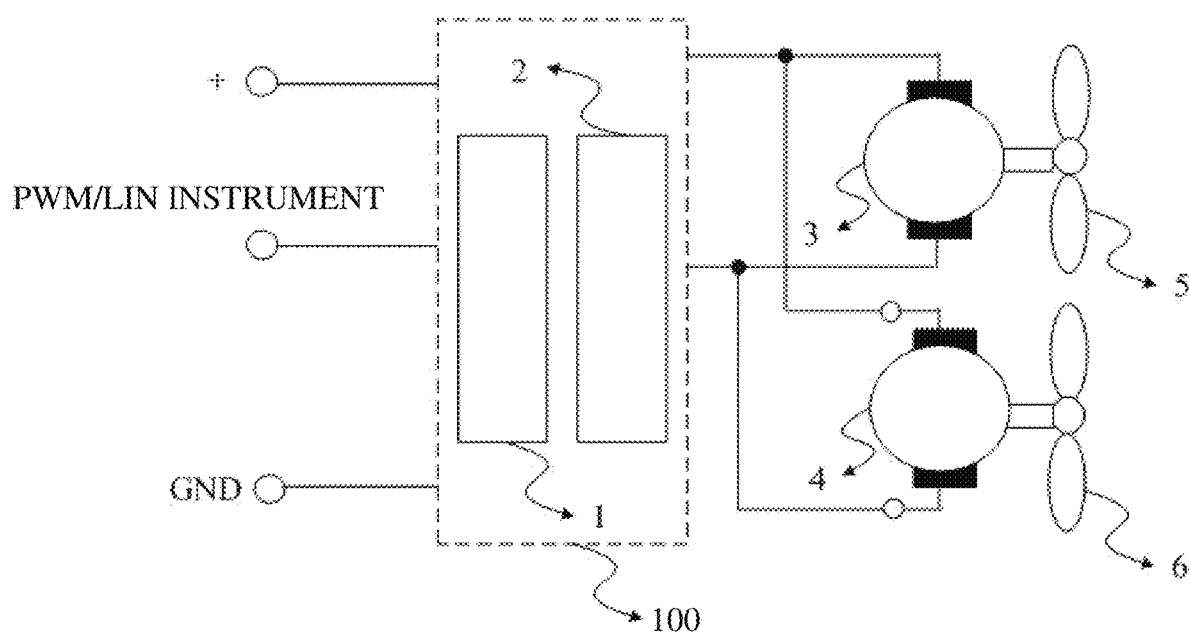
FIG. 1 is a schematic block diagram of a cooling fan module having two motors and an actuator in according with a first embodiment.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Referring to FIG. 1, an embodiment of a cooling fan module includes an actuator in according with a first embodiment, a first cooling fan 5, and a second cooling fan 6. The actuator includes a controller 100 for brush DC motors, a motor 3 to drive the first cooling fan 5, and a motor 4 to drive the second cooling fan 6. The motor 3 and the motor 4 are both brush DC motor. The controller 100 includes a controlling unit 1 for receiving control commands (for example, PWM commands, LIN commands, etc.), and a motor driving unit 2 electrically connected to the controlling unit 1 and powered by a DC power supply. The motor drive unit 2 is provided with an output interface to simultaneously drive the motor 3 and the motor 4. The controller 100 is integrated in or on the motor 3. Therefore, the motor 3 is directly electrically coupled to the controller 100. The motor 4 is connected in parallel to the motor 3 with two additionally wires. Therefore, the motor 3 and the motor 4 share the same controller 100, and no additional controller is required.

Figure 2:
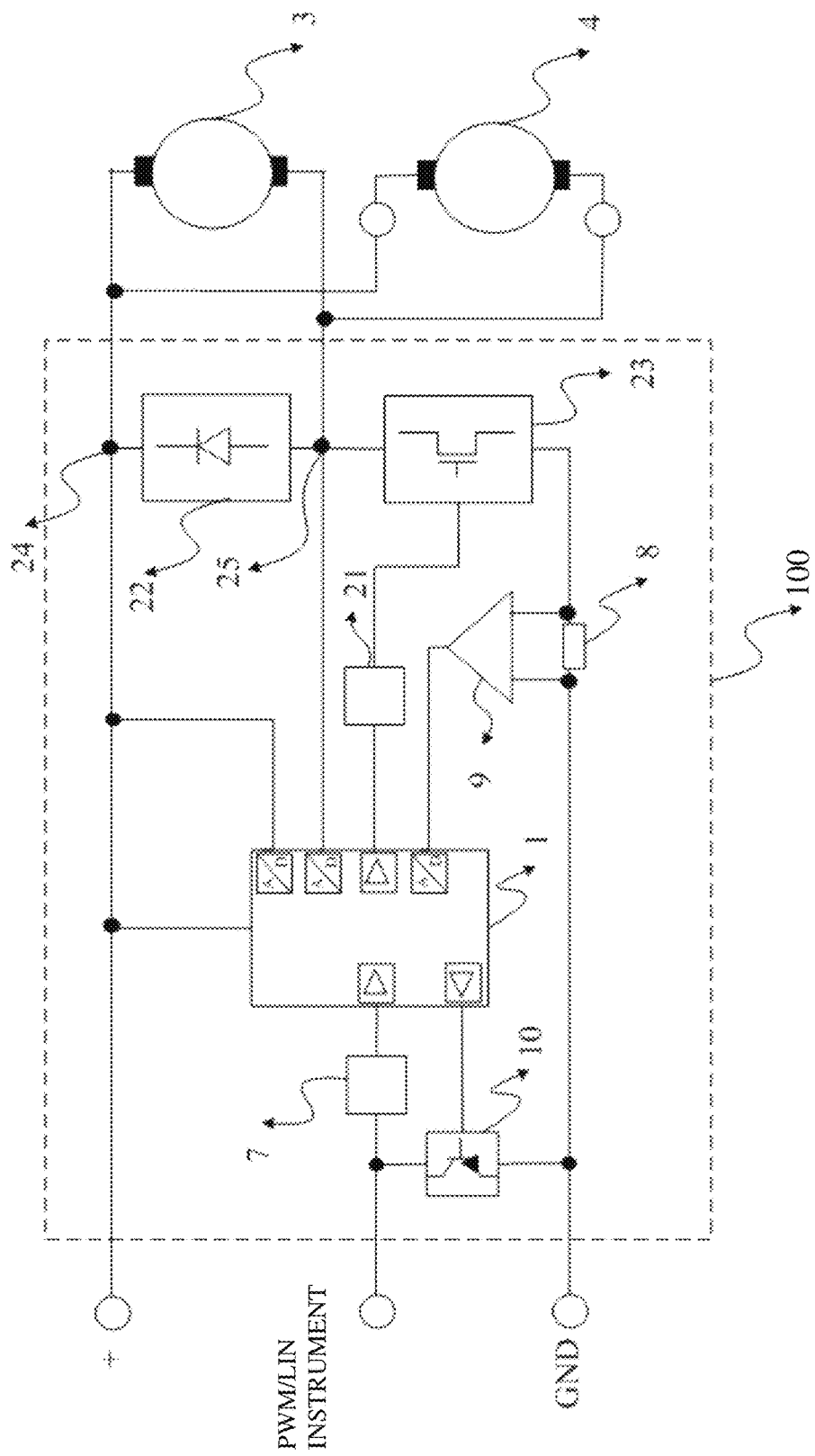
FIG. 2 is a schematic diagram of a circuit of the actuator of FIG. 1.

Referring also to FIG. 2, in the first embodiment of actuator, the motor drive unit 2 includes a drive circuit for DC brush motor. Specifically, the motor drive unit 2 includes a PWM member 21, a DC voltage regulator 22, an electronic switch 23, a positive output terminal 24, and a negative output terminal 25. An output of the controlling unit 1 is connected to an input of the PWM member 21. The electronic switch 23 is connected between the negative output terminal 25 and a ground end of the DC power supply. An output of the PWM member 21 is connected to a switching end of the electronic switch 23. The DC voltage regulator 22 is connected between the positive output terminal 24 and the negative output terminal 25. The positive output terminal 24 is further connected to the positive output of the DC power supply. Preferably, the DC voltage regulator 22 can be a Zener diode. Preferably, the electronic switch 23 can be a triode or a field effect transistor.

In the first embodiment of actuator, the controlling unit 1 includes a plurality of analog-to-digital converters. Two of the analog-to-digital converters are respectively connected to the positive output terminal 24 and the negative output terminal 25 of the motor driving unit 2. Therefore, the controlling unit 1 can real-time monitor a voltage of the power supply voltage and a voltage applied to the motor 3.

In the first embodiment of actuator, the controller 100 further includes a current feedback unit. Preferably, the motor current feedback unit may comprise a resistor 8 and an amplifier 9 connected in parallel with the resistor 8. The resistor 8 is connected between the motor drive unit 2 and the ground end of the DC power supply. The output of the amplifier 9 is connected to the controlling unit 1. The voltage on the resistor 8 is amplified by the amplifier 9, and then applied to the micro-processing unit 1. Therefore, the current flowing through the motor can be derived with one of the analog-to-digital converters. The total current of the cooling fan module can be real-time monitored.

In the first embodiment of actuator embodiment, the controller 100 further includes an instruction input interface 7 for a PWM or LIN protocol, and the instruction input interface 7 is connected to a command receiving end of the controlling unit 1.

In the first embodiment of actuator embodiment, the cooling fan module further includes a failure diagnostic unit 10. The failure diagnostic unit 10 may include an electronic switch connected between the instruction input interface 7 and the ground end of the DC power supply. A switching end of the electronic switch 23 is connected to the controlling unit 1. When there is a failure for a current or voltage of the cooling fan module, such as current stall, overcurrent, overvoltage, undervoltage, etc., the diagnostic unit 10 can be turned off and set the cooling fan module to a protection mode.

Figure 3:
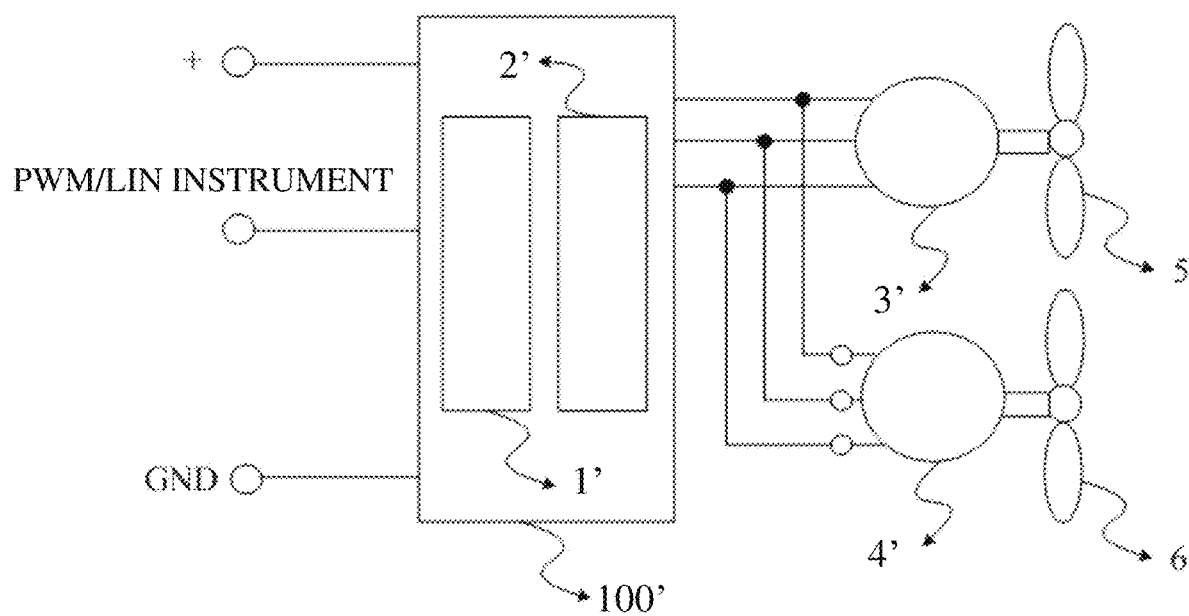
FIG. 3 is a schematic block diagram of a cooling fan module having two motors and an actuator in according with a second embodiment.

Referring to FIG. 3, another embodiment of a cooling fan module includes an actuator in according with a second embodiment, the first fan 5, and the second fan 6. The actuator includes a controller 100' for brushless motors, a motor 3', and a motor 4'. The motor 3' and the motor 4' are both brushless DC motor. The controller 100' includes a controlling unit 1' for receiving control commands (for example, PWM commands, LIN commands, etc.), and a motor driving unit 2' electrically connected to the controlling unit 1' and powered by a DC power supply. The controller 100' is integrated in or on the motor 3. Therefore, the motor 3' is directly electrically coupled to the controller 100'. The motor 4' is connected in parallel to the motor 3' with three wires respectively connected to three phases of the motor 3'. Therefore, the motor 3' and the motor 4' share the same controller 100', and no additional controller is required.

Figure 4:
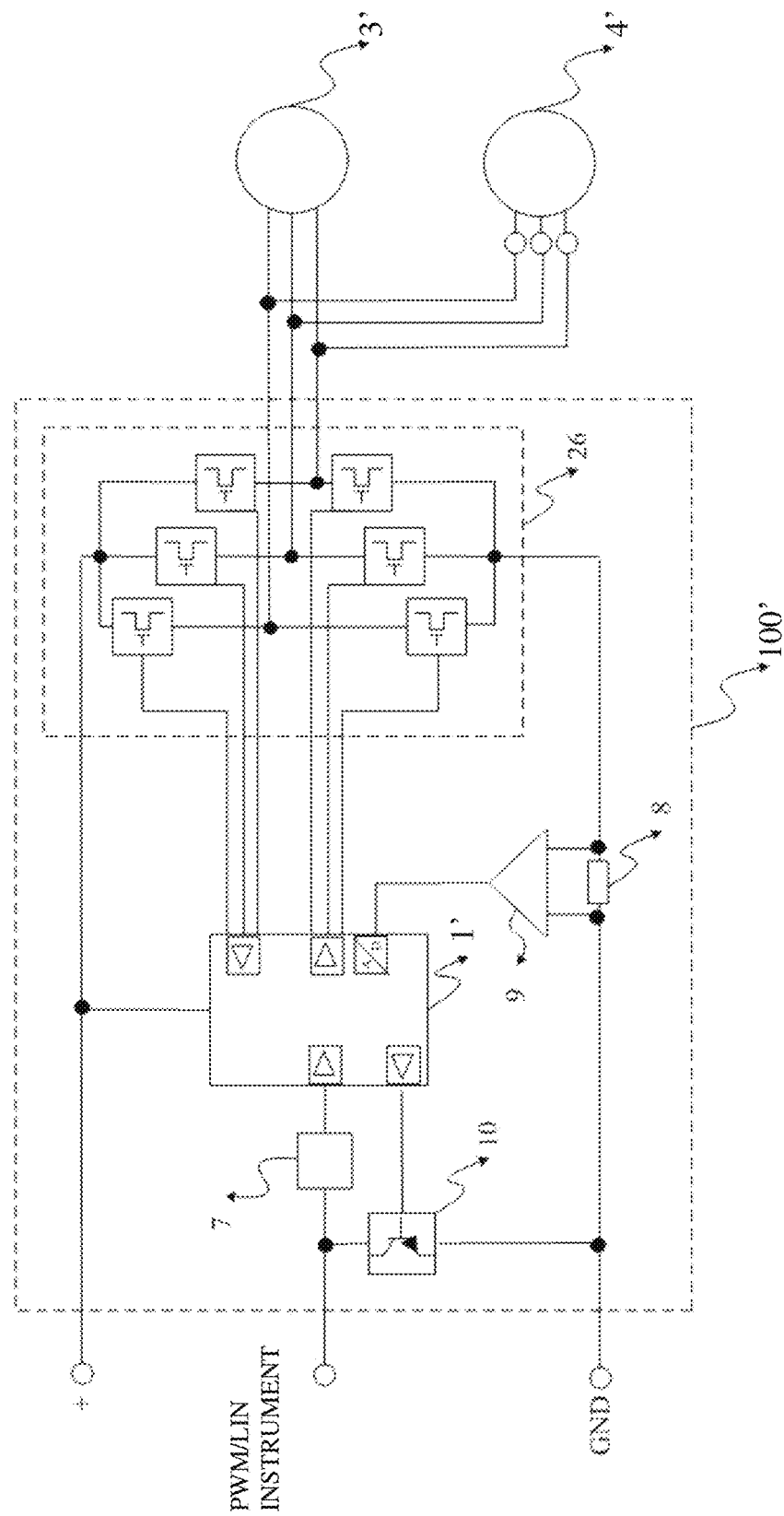
FIG. 4 is a schematic diagram of a circuit of the actuator of FIG. 3.

Referring to FIG. 4, in the second embodiment of the actuator, the motor drive unit 2' includes a drive circuit for brushless DC motor. Specifically, the motor drive unit 2' includes a three-phase bridge circuit 26 formed by six electric switches. The switching ends of the electric switches of the three-phase bridge circuit 26 are connected to the controlling unit 1' and controlled by PWM signals generated by the controlling unit.

In the second embodiment of actuator, the controller 100' further includes the instruction input interface 7 and/or the failure diagnostic unit 10 as that in the first embodiment of actuator.

Figure 5:
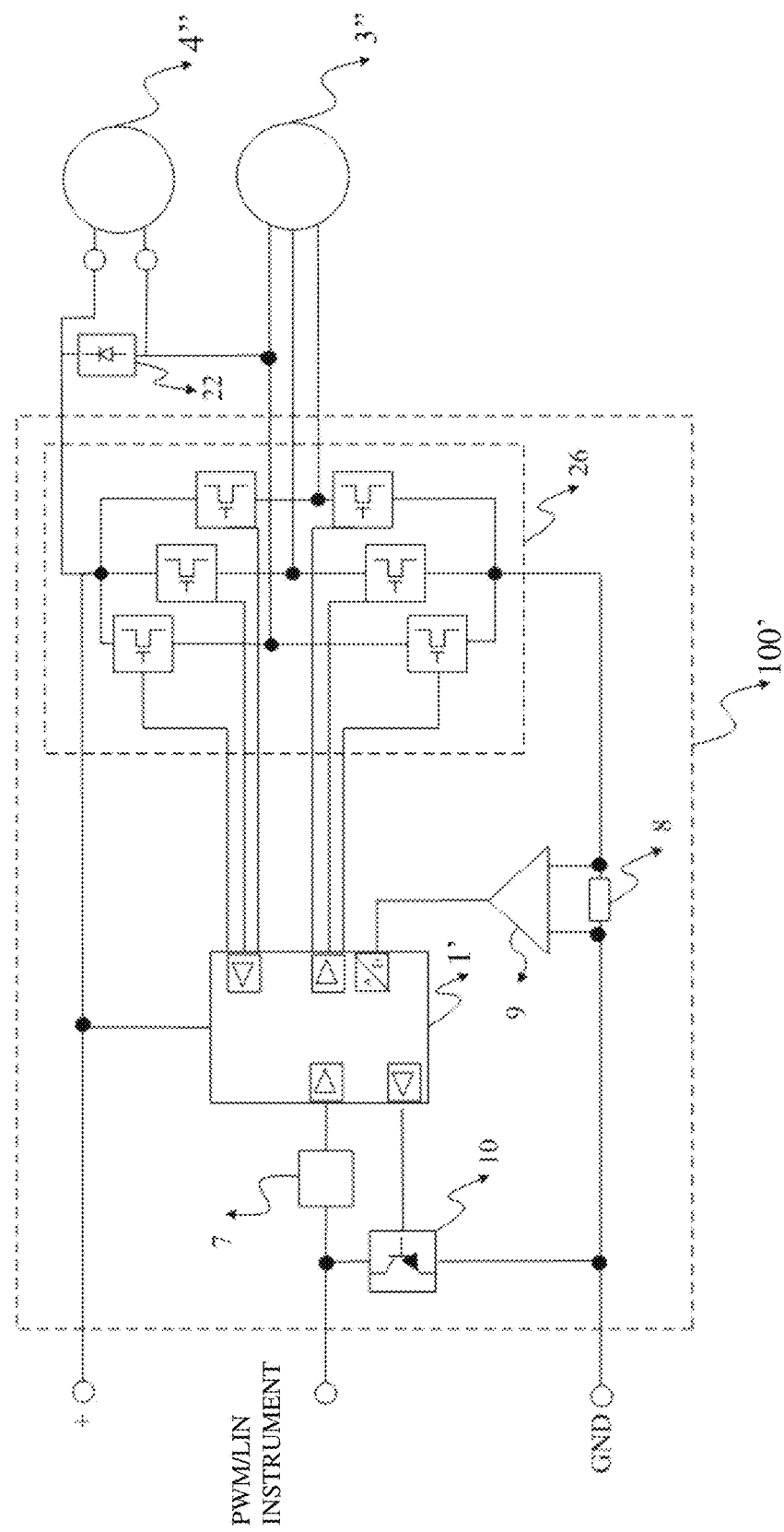
FIG. 5 is a schematic diagram of a circuit of the actuator in according with a third embodiment.

Referring to FIG. 5, a third embodiment of the actuator includes the controller 100' as the same in the second embodiment of actuator, the motor 3", and the motor 4". The motor 3" is a brushless DC motor. The motor 4" is a brush DC motor. The motor 3" is directly coupled to the controller 100'. The motor 4" is connected to the motor 3" with two wires. One of the wires is connected to a positive input of the three-phase bridge circuit 26. The other wire is connected to any of three output of the three-phase bridge circuit 26.

Figure 6:
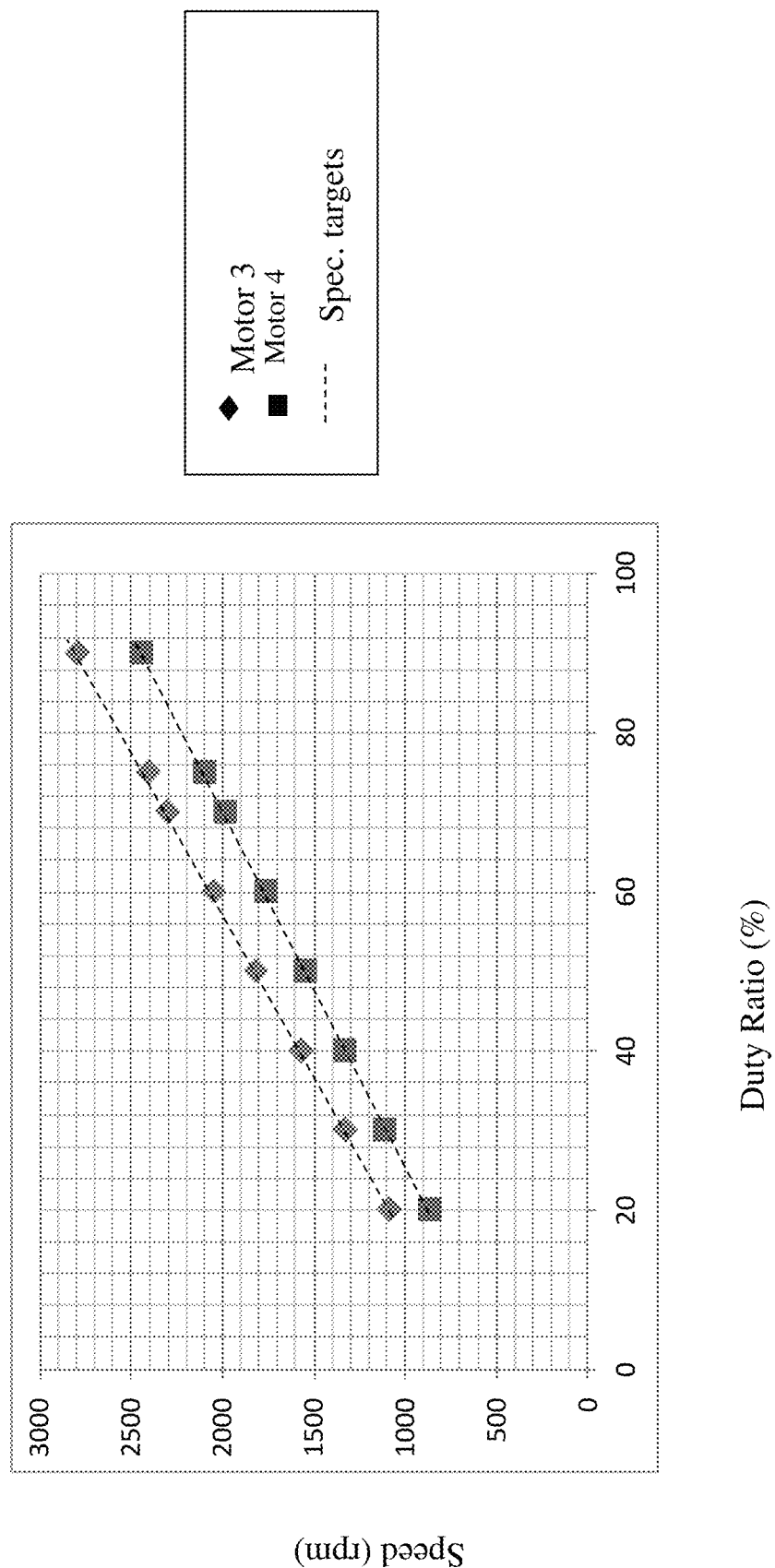
FIG. 6 is a velocity sampling curve of the two motors of FIG. 1.
Figure 7:
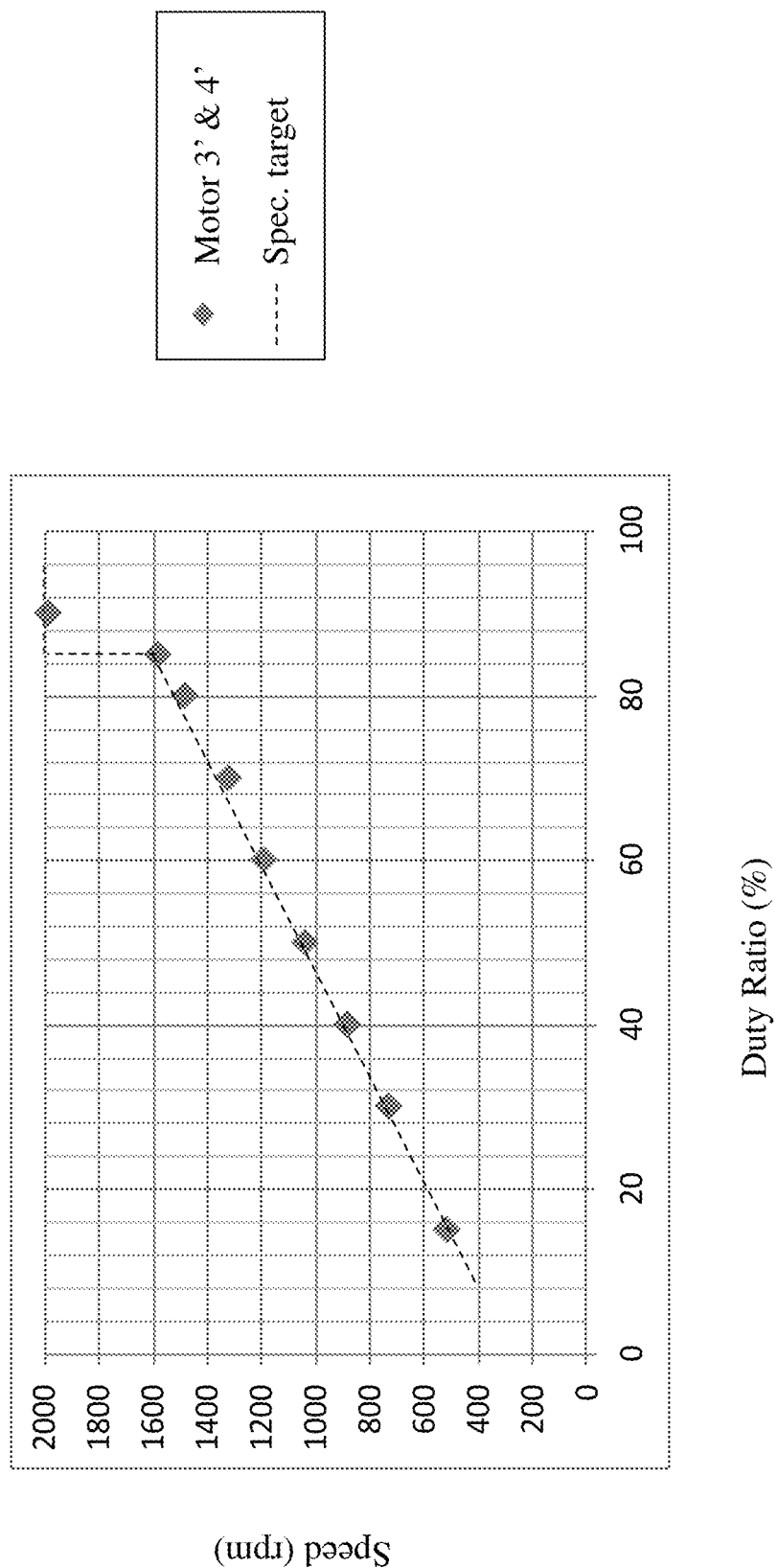
FIG. 7 is a velocity sampling curve of the two motors of FIG. 3.

In any of present embodiments above, the first fan 5 and the second fan 6 can work with synchronous speed control to be conveniently applied to certain field, such as cooling for an engine of automobile. Referring to FIG. 6, in the cooling fan with an actuator in according with the first embodiment and two brush DC motors, the speed of the two motors are different at a certain duty ratio of the electronic switch 23 according a controlling signal of controller 1. However, speed rates of the two motor relative to the duty ratio are almost the same. Therefore, the speed of the two motor are controlled synchronously by adjust the duty ratio of the PWM member 21. Referring to FIG. 7, in the cooling fan with an actuator in according with the second embodiment and two brushless DC motors, the speed of the two motors are almost the same at any duty ratio of the switches of the three-phase bridge circuit 26 according to a controlling signal of controller 1'.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:
1. An actuator, comprising
a controller comprising a controlling unit configured to receive control commands, and a motor driving unit electrically connected to the controlling unit and powered by a DC power supply;
a first motor electrically connected to the motor driving unit; and
a second motor connected in parallel to the first motor, wherein the first motor and the second motor are synchronously driven and controlled by the controller;
wherein the motor driving unit is configured to drive brush DC motors, and comprises a PWM member, a DC voltage regulator, an electronic switch, a positive output terminal, and a negative output terminal, an output of the controlling unit is connected to an input of the PWM member, the electronic switch is connected between the negative output terminal and a ground end of the DC power supply, an output of the PWM member is connected to a switching end of the electronic switch, two coupling ends of the DC voltage regulator are respectively connected with the positive output terminal and the negative output terminal, the DC voltage regulator is connected between the positive output terminal and the negative output terminal, the positive output terminal is further connected to the positive output of the DC power supply;
wherein the controlling unit comprises a plurality of analog-to-digital converters, two of the analog-to-digi- tal converters are respectively connected to the positive output terminal and the negative output terminal of the motor drive unit.

2. The actuator of claim 1, wherein the controller is integrated in or on the first motor, the second motor is connected in parallel to the first motor with wires.

3. The actuator of claim 1, wherein the controller further comprises a current feedback unit comprising a resistor and an amplifier connected in parallel with the resistor, the resistor is connected between the motor drive unit and the ground end of the DC power supply, the output of the amplifier is connected to the controlling unit.

4. The actuator of claim 1, wherein the controller further comprises an instruction input interface for a PWM or LIN protocol, and the instruction input interface is connected to a command receiving end of the controlling unit.

5. The actuator of claim 4, further comprising a failure diagnostic unit, wherein the failure diagnostic unit comprises an electronic switch connected between the instruction input interface and the ground end of the DC power supply, a switching end of the electronic switch of the failure diagnostic unit is connected to the controlling unit.

6. The actuator of claim 1, wherein the first motor is a brush DC motor, the second motor is a brush DC motor.

7. A cooling fan module comprising the actuator of claim 1, and two fans respectively driven by the first motor and the second motor.

* * * * *